US006562113B1

(12) United States Patent
Aykanian et al.

(10) Patent No.: US 6,562,113 B1
(45) Date of Patent: May 13, 2003

(54) APPARATUS AND METHOD FOR FLUID PURIFICATION

(75) Inventors: Arthur A. Aykanian, Laguna Hills, CA (US); Xiang Feng Dai, Bakersfield, CA (US); Philip M. Hodge, San Clemente, CA (US)

(73) Assignee: American Purification, Inc., Newport Beach, CA (US)

( * ) Notice: Subject to any disclaimer, the term of this patent is extended or adjusted under 35 U.S.C. 154(b) by 0 days.

(21) Appl. No.: 09/648,499

(22) Filed: Aug. 25, 2000

(51) Int. Cl.[7] .............................................. B01D 53/02
(52) U.S. Cl. ............................ 96/143; 96/130; 96/144; 96/146; 95/141; 95/148
(58) Field of Search ........................ 95/1, 13, 90, 107, 95/110, 111, 114, 121, 122, 126, 141, 148, 901, 903; 96/108, 109, 123, 130, 143, 146, 150, 151, 144; 34/259, 264, 265

(56) References Cited

U.S. PATENT DOCUMENTS

| | | | | |
|---|---|---|---|---|
| 2,397,566 A | * | 4/1946 | Schutte .......................... | 96/123 |
| 3,798,877 A | * | 3/1974 | Lamb ............................ | 95/110 |
| 3,966,879 A | * | 6/1976 | Groenendaal et al. ........ | 95/107 |
| 4,255,166 A | * | 3/1981 | Gernand et al. .............. | 96/150 |
| 4,263,028 A | * | 4/1981 | Ohlmeyer et al. ............ | 96/150 |
| 4,650,647 A | * | 3/1987 | Kito et al. ..................... | 95/110 |
| 4,698,071 A | * | 10/1987 | Elias ............................ | 96/150 |
| 4,740,310 A | * | 4/1988 | Dickey ......................... | 95/107 |
| 4,869,734 A | * | 9/1989 | Jacquish ....................... | 95/111 |
| 4,902,311 A | | 2/1990 | Dingfors et al. .............. | 55/60 |
| 5,069,689 A | * | 12/1991 | Goldhaar ...................... | 96/130 |
| 5,308,590 A | * | 5/1994 | Kersey et al. ................ | 95/107 |
| 5,509,956 A | * | 4/1996 | Opperman et al. ........... | 95/141 |
| 5,580,461 A | * | 12/1996 | Cairns et al. ................. | 95/148 |
| 5,581,903 A | * | 12/1996 | Botich .......................... | 95/126 |
| 5,667,559 A | * | 9/1997 | Vickery ........................ | 95/110 |
| 5,904,750 A | * | 5/1999 | Cowles ......................... | 96/150 |
| 5,946,816 A | * | 9/1999 | Smith ........................... | 34/265 |
| 6,022,399 A | * | 2/2000 | Ertl et al. ..................... | 95/148 |
| 6,379,435 B1 | * | 4/2002 | Fukunaga et al. ............ | 96/150 |

* cited by examiner

*Primary Examiner*—Duane Smith
*Assistant Examiner*—Jason M. Greene
(74) *Attorney, Agent, or Firm*—Richard L. Myers; Myers Dawes Andras & Sherman LLP

(57) ABSTRACT

An apparatus and method are disclosed for purifying a contaminated fluid stream, for example an air stream contaminated with volatile organic compounds. A sorption media is directed between narrowly spaced plates which control the depth of sorbant flow. In an adsorber the plates are porous to allow the contaminated air to pass into an adsorption chamber where the media removes the contaminates from the fluid stream. In a desorber the plates may be transmissive or reflective of microwave energy and porous to a purging gas in a desorption chamber where the media releases the contaminates to refresh the media. An inclined plane or conical surface is contemplated for a desorber which can be coupled to an adsorber in a closed loop system.

8 Claims, 9 Drawing Sheets

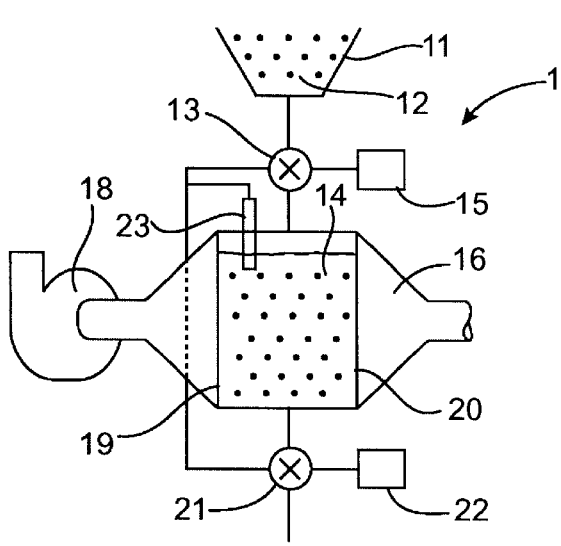
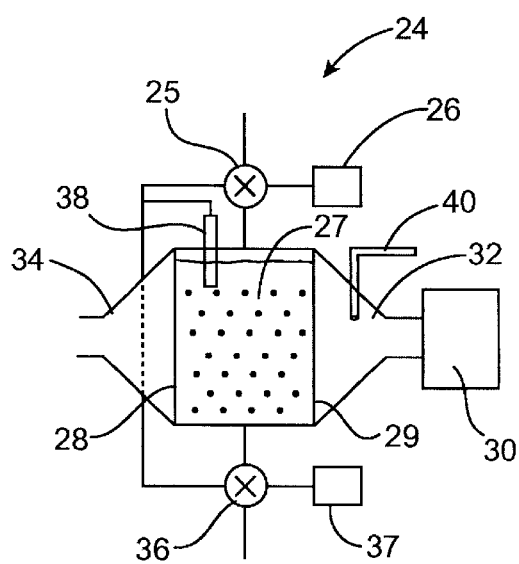
FIG. 1
FIG. 2
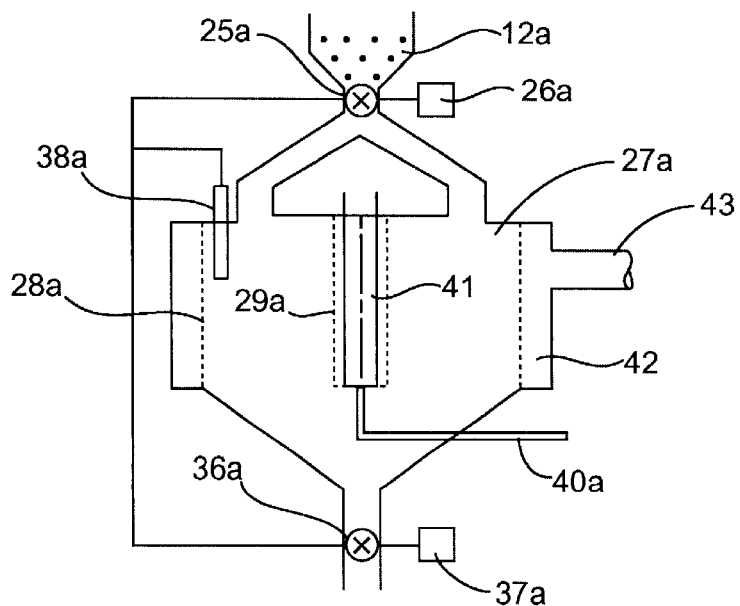
FIG. 3

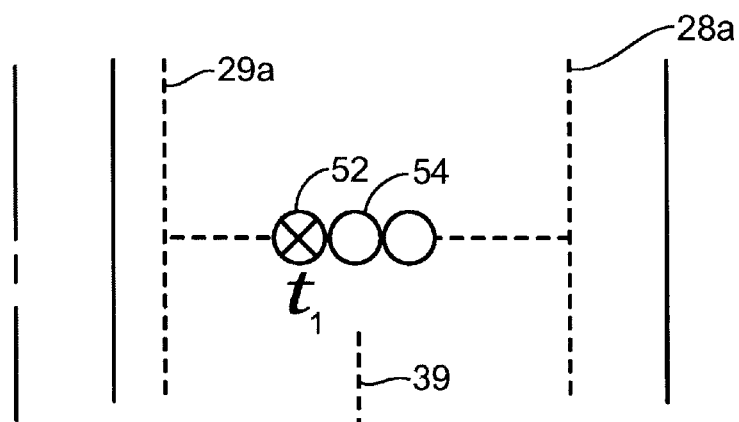
FIG. 5a
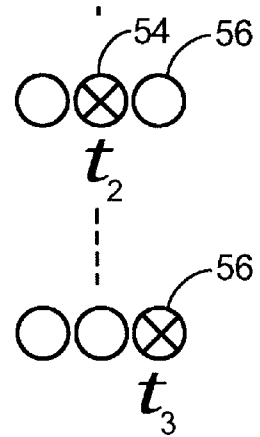
FIG. 5b
FIG. 5c

APPARATUS AND METHOD FOR FLUID PURIFICATION

BACKGROUND OF THE INVENTION

1. Field of the Invention

This invention relates generally to methods and apparatus for sorbing organic substances onto a media and desorbing the organic substances from the media.

2. Discussion of the Prior Art

Industrial ventilation air is often laden with organic substances, such as solvents, which are commonly referred to as volatile organic compounds or VOCs. In the interests of purifying this ventilation air, it is desirable to remove the VOCs from the ventilation air. As taught by Dingfors et al, in U.S. Pat. No. 4,902,311, which is incorporated herein by reference, the VOCs can be adsorbed onto microporous polymeric particles. These particles can then be fed into a desorption chamber in which the solvent is desorbed from the adsorption media, stripped off and condensed in a cooler.

The desorption is typically accomplished by heating the media, for example with microwaves, as taught by Opperman in U.S. Pat. No. 5,509,956, which is incorporated herein by reference. Opperman teaches that the VOC-laden adsorption media can be contained in a cylindrical vessel with microwaves introduced down an axial waveguide and radiated outwardly through the adsorption media. This structure tends to facilitate uniform heating throughout the adsorption media. Nevertheless, in this batch process, the microwave energy tends to form standing waves which have peaks of high energy and valleys of low energy. For this reason, even the symmetrical structure of the cylindrical container tends to develop hot and cold spots within the batch media.

When the adsorption media is presented with a significant depth, it has been found that the microwave energy tends to create a temperature front that travels outwardly through the depth of the media. For example in a normal batch process, the adsorption media may have a thickness such as eight inches through which the microwave energy must pass. As the temperature front contacts one bead, its VOCs are driven off and adsorbed by the next outwardly-adjacent bead. When the front contacts the second bead those VOCs are driven off to the third bead where they are first adsorbed and then ultimately desorbed. This process, commonly referred to as progressive adsorption/desorption, requires a significant period of time as the temperature front passes radially outwardly through the depth of the media.

Adsorption processes of the past have also contained the media in fluidized beds. These beds are typically stacked and the contaminated air directed progressively through the stack. A high velocity of air is required to percolate through the beads in this adsorption process. The fluidized beds may be angled slightly to promote translation of the beads among the beds. Nevertheless, the process is substantially static as it may require several days for the full translation of beads to occur.

It is always desirable to accomplish the adsorption and desorption with a minimum amount of energy and a maximum throughput of VOCs. Of particular interest is any reduction in the quantity of adsorption media required to accomplish the air purification. Since this adsorption media can be particularly expensive, large volume requirements greatly increase the cost of purification.

SUMMARY OF THE INVENTION

In accordance with the present invention, an apparatus and method is disclosed which provides for a continuous flow of the adsorption media, initially through an adsorption chamber and ultimately through a desorption chamber in a continuous closed process. The adsorption media can be introduced through an adsorber and a desorber each having a media flow shaper which maximizes the efficiency of both the adsorber and desorber based on the adsorption kinetics of the media. With a continuous flow of the media through the adsorption and desorption chambers, each particle of the media is exposed to many different levels of energy in the pattern microwave. Thus the continuous flow of the adsorption media promotes even further uniform heating of the media as it passes through the various energy levels of the pattern.

In addition, the thickness of the media is controlled and limited in order to reduce the significant delay associated with the progressive adsorption/desorption at a temperature front. For example, the media can be introduced through a flow shaper, which limits the thickness of the media flow, for example, to only one inch. Parallel plates can be used to shape this media flow, or alternatively, the media can be introduced onto the apex of a cone in order to produce a layer which progressively thins as the media spreads towards the base of the cone.

In an adsorption chamber, the media shaper can include two porous barriers or plates between which the media continuously flows and across which the VOC laden air can be introduced to the media. In an adsorption apparatus, the barriers can comprise screens or plates formed of porous materials which are penetrable by the contaminated air.

In a desorber, similar plates can shape the media flow. In a desorption apparatus, the plates can be ceramic to permit penetration of the microwave energy, and porous where it is desirable to introduce a purge gas, such as nitrogen.

In one aspect of the invention, an apparatus for removing VOCs from a gas stream flowing along a gas flow path includes an adsorber with an adsorption chamber having a first dimension along the gas flow path. A desorber receives the adsorption media with the adsorbed VOCs, and desorbs the VOCs from the adsorption media. A microwave generator provides a microwave flow path through a desorption chamber which has a second dimension along the microwave flow path. The first dimension of the adsorption chamber is greater than the second dimension of the desorption chamber.

In another aspect of the invention, a media flow distributor is adapted to control a flow of sorption media through a sorber. A media flow shaper receives the flow of sorption media and provides the flow with a restricted width not greater than a predetermined width along a particular surface. A conduit for receiving an energy stream in proximity to the media flow shaper and for directing the energy stream generally normal to the particular surface, facilitates sorption relative to the media. In a desorber the predetermined width will typically be less than one inch in order to limit progressive adsorption/desorption along a temperature front.

An adsorption system characterizes a further aspect of the invention. In this system a material is continuously adsorbed onto an adsorption media. A conduit for containing the material in a gas flow continuously directs the gas flow along a gas flow path. A media flow shaper disposed in the gas flow path is adapted to receive the media and to continuously direct the media along a media flow path transverse to the gas flow path. The media flow chamber is at least partially defined by a porous wall penetrable by the gas flow. A first valve is operable to move the media to the media flow shaper at a first throughput, while a second valve is operable to move the media from the media flow shaper at a second throughput equal to about the first throughput. The first and second valves have properties facilitating flow of the media through the valves while inhibiting flow of any gas through the valves.

In a further aspect of the invention, a sorption system is provided for sorbing a material relative to a sorption media. A source of energy, having properties for moving material relative to the adsorption media, is coupled through a conduit which directs the energy flow along an energy flow path. A media flow shaper is disposed in the energy flow path and adapted to receive the sorption media. A wall is included in the media flow shaper for directing the media flow path transverse to the energy flow path, the wall being disposed between the media flow path and the source of energy. The wall is transmissive of the energy so that the conduit directs the energy through the wall and into the media flow path to sorb the material relative to the sorption media.

These and other features and advantages of the invention will become more apparent with a description of preferred embodiments and reference to the associated drawings.

DESCRIPTION OF THE DRAWINGS

FIG. 1 is a schematic view of an adsorber providing for a continuous flow of adsorption media through an adsorption chamber, which may include a media flow shaper;

FIG. 2 is a schematic view of a desorber including a desorption chamber receiving a continuous flow of contaminated adsorption media, which may include a media flow shaper;

FIG. 3 is a schematic view of a desorber having a cylindrical desorption chamber receiving a continuous flow of adsorption media and having a coaxial microwave distributor;

FIGS. 5a–5c are sequential schematic views of a desorption chamber illustrating the undesirable progressive adsorption/desorption characteristics of a thick adsorption media;

FIG. 5a illustrates juxtaposed beads at a time $t_1$;

FIG. 5b illustrates the beads at a time $t_2$;

FIG. 5c illustrates the beads at a time $t_3$;

DESCRIPTION OF PREFERRED EMBODIMENTS AND BEST MODE OF THE INVENTION

Figure 4:
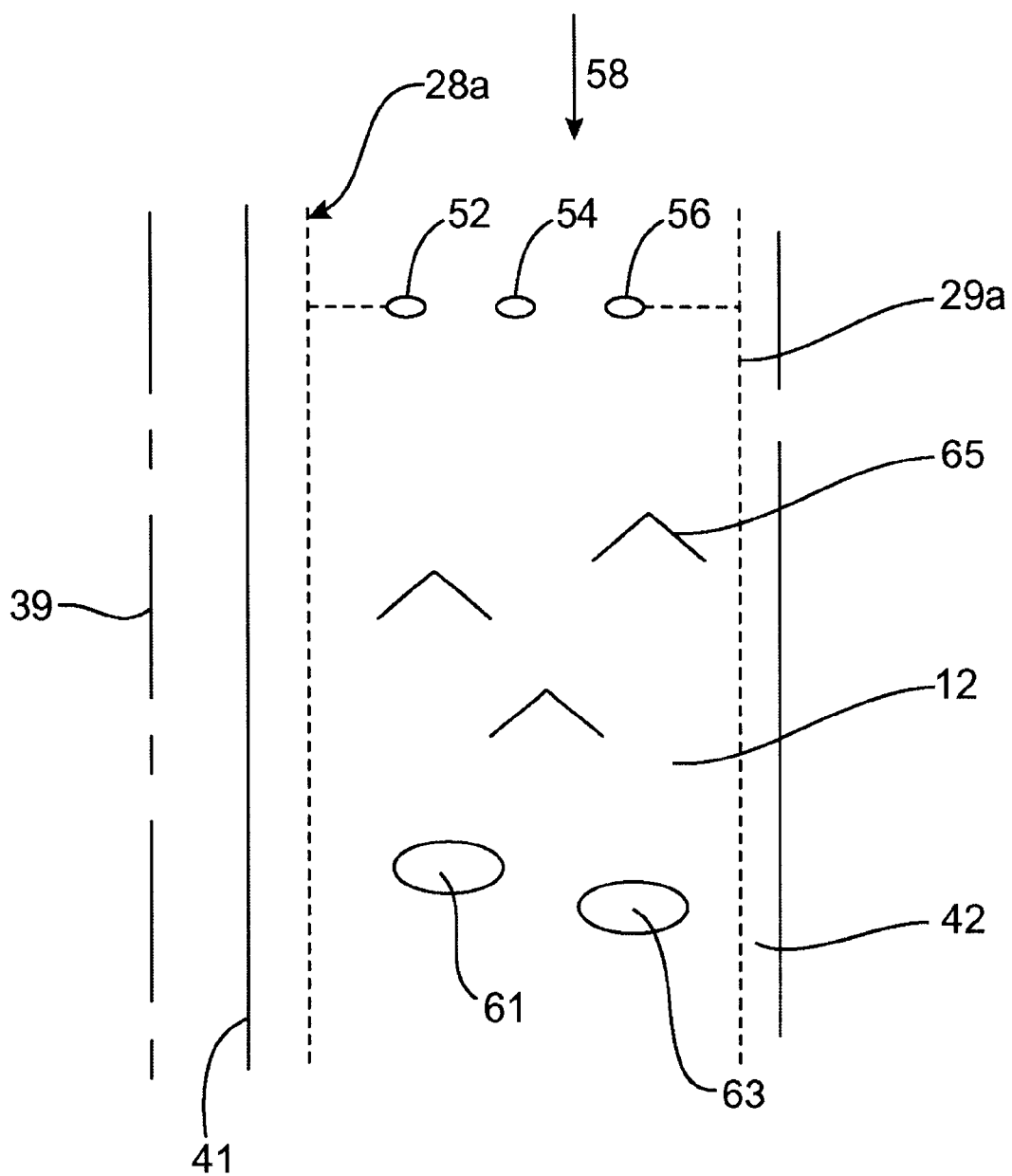
FIG. 4 is a schematic view of a desorption chamber having temperature variations which produce different effects in a batch process of the prior art.

Particularly in industrial applications, it may be desirable to remove contaminants such as volatile organic compounds (VOCs) from a flow of fluid, such as air. Broadly speaking, there are many such processes which rely on a carrier to which the contaminant is attracted from the stream and from which the contaminant can be removed to refresh the carrier. Within this context, the contaminated stream may be any flow of fluid, either liquid or vapor. The contaminant may be any component of the stream, such as an absorbate or adsorbate. The carrier may be any media capable of attracting the contaminant from the stream and for withholding the contaminant from the stream. In many cases, the carrier will include an absorbent material, an adsorbent material, or even an ion exchange material. A cleaner for processing the contaminated carrier may include any source of energy capable of driving the contaminant from the carrier to refresh the carrier. In order to include all of these possible processes within the scope of this disclosure, the contaminated stream will be referred to merely as a fluid stream. The contaminant will be referred to merely as a sorbate and the carrier will be referred to merely as a sorbant. Other conjugates of the verb "sorb" will be used in order to maintain a broad focus for this concept.

In one such process, contaminants from a fluid stream have been passed through an adsorption chamber containing resins, typically in the form of small beads having diameters in a range between 0.5 mm to 1.5 mm. In the past, this adsorption has been accomplished in a batch process or a fluidized bed process wherein the adsorption media is held in a container for a considerable period and replaced only when the VOCs have effectively saturated the adsorption media. The contaminated gas has been introduced into the batch container and clean air has been withdrawn from the container by a blower leaving contaminants adsorbed onto the adsorption media.

In accordance with the present invention, adsorption is accomplished with a continuous flow of the adsorption media through the adsorption chamber. FIG. 1 illustrates such an embodiment wherein an adsorber 10 includes a hopper 11 which initially contains an adsorption media or beads 12. The hopper 11 is connected through a rotary valve 13 to an adsorption chamber 14. In this embodiment, the rotary valve 13 is driven by a motor 15. In the illustrated embodiment, the chamber 14 is defined by opposing walls 19 and 20 which are preferably porous in order to permit a flow of the contaminated air from a diffuser 16, and across the wall 20 into the chamber 14. Within the chamber 14, the contaminates are adsorbed onto the media 12. The remaining clean air is withdrawn across the wall 19 by a blower. 18. The adsorption media, with the contaminates adsorbed thereon, are withdrawn from the chamber 14 through a rotary valve 21 driven by a motor 22.

In order to maintain a continuous flow of the media through the chamber 14, the rotary valves 12 and 21 can be generally synchronized by a sensor 23 which maintains the level of media within the chamber 14 at a predetermined height. If the sensor 23 indicates that the level of media 12 within the chamber 14 is higher than desired, the speed of the rotary valve 21 can be increased or the speed of the rotary valve 12 can be decreased depending on the throughput desired for the media. Similarly, if the level of media 12 within the chamber 14 is lower than desired, the speed of the rotary valve 21 can be decreased or the speed of the rotary valve 12 can be increased depending on the desired throughput for the media.

In an alternative embodiment, it is appreciated that the rotary valve 13 may not be required at all. In such an embodiment, some of the contaminated air from the diffuser 16 may pass upwardly into the hopper 11 where it attaches to the media 12. The fact that this media receives some pre-contamination, may not affect a particular process since the media merely passes into the adsorption chamber 14 where it is further contaminated. Using only the single rotary valve 21 in such an embodiment would simplify operation of the unit and reduce the cost of equipment.

The adsorption of most VOCs onto the resin beads 12 occurs very rapidly, for example in about 20 msec. As a result, a continuous flow of the beads 11 through the chamber 14 is particularly advantageous as it continuously brings fresh media into contact with the contaminated air. With a continuous flow of the media, a higher velocity of the contaminated air can be accommodated by the adsorber.

In the past desorption chambers have also been provided for removing the contaminants from the adsorption media or beads. This has also been accomplished in a batch process. For example, it is taught by Opperman in U.S. Pat. No. 5,509,956, which has been incorporated herein by reference. In this batch process, the contaminated media is disposed in a desorption chamber and exposed to microwave energy which heats the beads driving off the VOCs and other contaminates. The resulting stream of VOCs can be condensed to a liquid state and disposed of or reused as appropriate. The clean beads are then removed from the chamber and replaced by another batch of contaminated beads.

In accordance with the present invention, a continuous process and apparatus is disclosed such as that illustrated in FIG. 2. In this embodiment, contaminated beads 12 can be fed through a rotary valve 25 driven by a motor 26, and introduced into a desorption chamber 27 having opposing walls 28 and 29. Microwaves produced by a magnetron 30 can be directed by a waveguide 32 across the wall 29 and into the desorption chamber 27. Within the chamber 27, the continuous flow of beads 12 is heated sufficiently to drive off the VOCs by means of a vacuum source 34. The clean beads 11 are continuously drawn out of the desorption chamber 27 by a rotary valve 36 driven by a motor 37.

The rotary valves 25 and 36 on opposite sides of the desorption chamber 27 can be controlled by a sensor 38 to maintain the media within the chamber 27 at a predetermined level. When that level is higher than desired, the speed of the rotary valve 36 can be increased or the speed of the rotary valve 25 can be decreased in accordance with the desired throughput of the media 12. Alternatively, if the level of the media within the chamber 27 is lower than desired, the speed of the rotary valve 36 can be decreased or the speed of the rotary valve 25 can be increased depending on with the desired throughput of the media 12.

The walls 28 and 29 forming the desorption chamber 27 are preferably transmissive to the microwave energy of the magnetron 30 so that the microwaves can travel from the waveguide 32 and into the media 12 within the chamber 27. The walls 28 and 29 may also be porous in order to permit passage of a purging gas through the desorption chamber 27. Thus a purging gas may be introduced through a conduit 40 into the waveguide 32 and across the wall 29. Preferably this gas is inert so that it displaces any volatile gas such as oxygen from the chamber 27, and carries the VOCs across the wall 28 toward the vacuum source 34. Nitrogen is used in a preferred process of the present invention. In another embodiment of the invention, a continuous desorption process can be achieved with an apparatus similar to that disclosed by Opperman in U.S. Pat. No. 5,509,956.

In FIG. 3, elements of structure similar to those previously discussed are designated with the same reference numeral followed by the lower case letter "a". Thus, the desorption chamber is designated by the reference numeral 27a. As taught by Opperman, this chamber 27a can be cylindrical with an axis 39, and can be provided with a waveguide 41 extending axially of the cylinder. Microwaves are radiated outwardly from the waveguide 41 and the contaminants drawn off through a circumferential jacket 42 connected to an outlet 43. In the matter previously disclosed, a continuous flow of the media into the chamber 27a can be controlled by the rotary valve 25a and an associated motor 26a. Removal of clean media from the chamber 27a is facilitated by the rotary valve 36a which can be controlled by the motor 37a. The rotary valves 25a and 36a can be synchronized by the sensor 38a in the manner previously disclosed, to provide a continuous flow of the media 12a through the desorption chamber 27a.

In this embodiment, the chamber 27a is defined by an interior wall or screen 29a which surrounds the waveguide 41, and an exterior wall or screen 28a which separates the chamber 27a from the circumferential jacket 42. An inert purging gas, such as nitrogen, can be introduced through a conduit 40a and into the waveguide 41. This inert gas carries the contaminants radially outwardly to the circumferential jacket 42 and into the outlet 43. As in the previous embodiment, the walls 28a and 29a are preferably transparent to the microwave energy and transmissive of the purging gas. In this case, the walls 28a and 29a are formed of porous ceramics.

As microwave energy is transmitted into a desorption chamber, it tends to create variations in temperature. High energy areas are referred to as hot spots 61, and various sites of low energy are referred to as cold spots 63. These spots 61 and 63 are generally dependent upon the magnetron producing the microwaves, the waveguides distributing the microwaves, as well as the structure of the desorption chamber. By providing a flow of the VOC ladened media, each bead (such as the beads 54–56) will tend to experience both hot spots 61 and cold spots 63 so that their movement through the static locations tends to average the energy experienced by each bead. Thus, the flow of the VOC ladened media associated with the present invention can be of particular advantage in maintaining a uniform heating of the VOC. In this context it may also be desirable to provide vanes within the media flow to promote channeling into or away from the hot spot 61 and cold spot 63. One such vane is illustrated in FIG. 4 and designated by the reference numeral 65.

The advantage of this continuous process for desorption can be better appreciated with reference to FIG. 4 which illustrates adjacent beads 52, 54 and 56 of the media 12, which are positioned radially outwardly between the walls 28a and 29a. These beads 52, 54 and 56 are moving with the flow of media 12a downwardly in FIG. 4 as shown by the arrows 58.

In the past, the adsorption chambers and desorption chambers have provided a significant depth of the media, such as 8 inches. In an adsorber, this depth has offered considerable resistance to the flow of contaminated air through the adsorption chamber. As a result, higher energy has been required in order to move the contaminated air through the substantial thickness of the media. Alternatively, more time has been required to effect the desired adsorption with a greater thickness of media.

In the context of a desorber, the substantial thickness of media has resulted in a progressive adsorption/desorption phenomena better understood with reference to FIGS. 5a–5c. These schematic illustrations are similar to FIG. 4 in structure and also illustrates the adjacent beads 52, 54 and 56 which are positioned progressively radially outwardly. At an initial time to illustrated in FIG. 5a, the microwave energy produces a temperature front which begins to flow from the axis 39 radially outwardly from the wall 29a to the wall 28a. Initially this temperature front raises the temperature of the VOCs causing the contaminates to be desorbed. Since the bead 54 is not yet at this desorption temperature, the contaminates from the bead 52 are immediately adsorbed onto the bead 54.

As the temperature front continues to move radially outwardly, the bead 54 reaches the elevated temperature as illustrated in FIG. 5b. At this time $t_2$, the contaminates originally carried by the bead 54, and those more recently adsorbed from the bead 52, are released. These contaminants are adsorbed onto the bead 56 which has not yet reached the elevated temperature.

At a time $t_3$ illustrated in FIG. 5c, the temperature front reaches the bead 56 and causes its volatiles to be released. This progressive adsorption/desorption phenomena greatly increases the time required to desorb all of the contaminants from the desorption media.

Figure 6:
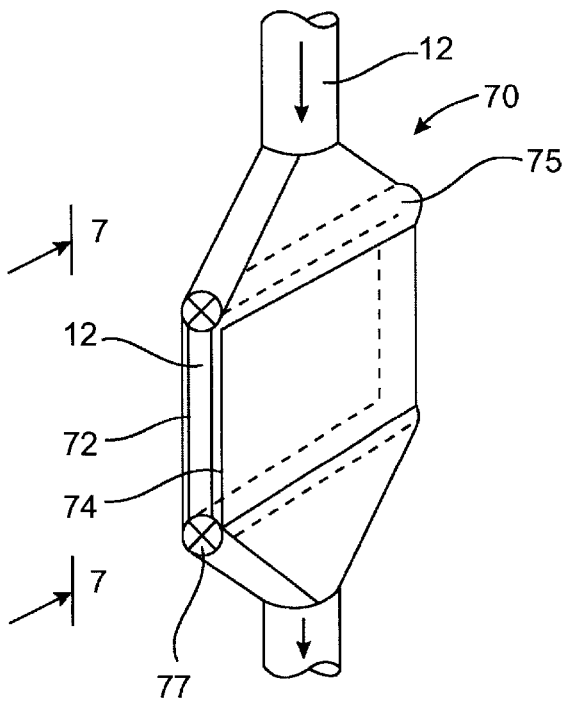
FIG. 6 is a perspective view of a parallel plate media shaper for use in either an adsorber or desorber.
Figure 8:
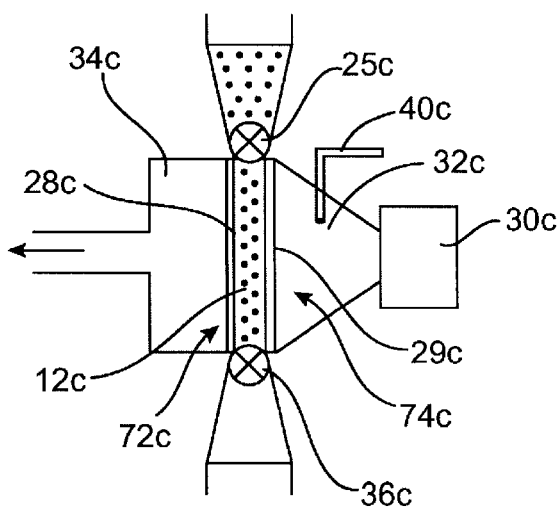
FIG. 8 is a side elevation view of the parallel plate media shaper in a desorber of the present invention.
Figure 7:
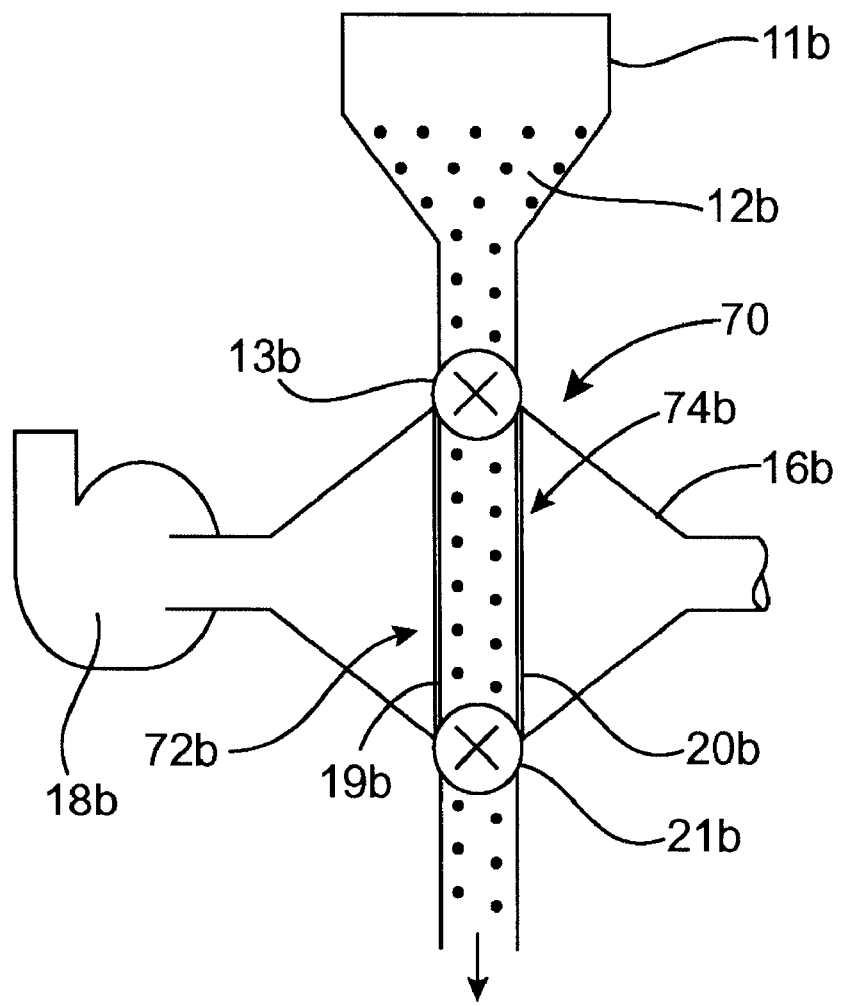
FIG. 7 is a side elevation view taken along line 7—7 of FIG. 6 and further illustrating the parallel plate media shaper in an adsorber of the present invention.

In order to reduce the effect of this phenomena in the present invention, the thickness of the media in both the adsorption chamber 14 and the desorption chamber 27 is restricted for example to one inch or less. This greatly reduces the consequences of the adsorption/desorption phenomena and accordingly the amount of time required to adsorb and desorb the media. As illustrated in FIGS. 6–8, both the adsorber 10 and the desorber 24 can be provided with a media flow shaper 70 in order to limit the thickness of media flow within the respective chambers 14 and 27. The media shaper 70 illustrated in FIG. 6 includes a pair of walls or barriers 72 and 74 which are closely separated by a predetermined distance desired for the depth of the media 12. A continuous flow of the media 12 between the barriers 72 and 74 can be controlled in the manner previously discussed by positioning rotary valves 75 and 77 along opposing sides of the barriers 72 and 74.

Although the barriers 72 and 74 can be closely separated by a distance which may vary along the media flow, this distance is maintained constant in a preferred embodiment of the invention. Even with parallel plates, the distance of separation can be controlled in accordance with the adsorption dynamics of the media 12. For example, it has been found that the distance separating the parallel plates or barriers 72, 74 may be between 1/16 inch and 1 inch. In a preferred embodiment, the barriers 72 and 74 are separated by a distance of only 1/8 inch.

In FIG. 7, the media flow shaper 70 is illustrated in the context of the adsorber 10 where elements of structure similar to those previously discussed are designated by the same reference numeral followed by the lower case letter "b". Thus the diffuser 16b introduces the contaminated gas to the barrier 74b which forms the wall 20b. The blower 18b is coupled to the diffuser 72b which forms the wall 19b in the adsorber 10. From this view it can be appreciated that both barriers 72b and 74b need to be porous or otherwise transmissive of the gas flow.

FIG. 8 is a side elevation view which illustrates the media flow shaper 70 in the structure of the desorber 24. In this view, elements of structure similar to those previously discussed are designated by the same reference numeral followed by the lower case letter "c". In the context of the desorber 24c illustrated in FIG. 8, it can be appreciated that the barrier 74c which forms the wall 29c must be transmissive to the microwave energy of the magnetron 30c. If a purging gas is also introduced to the waveguide 32c, the barrier 74c must also be porous to the flow of the purging gas.

Figure 9:
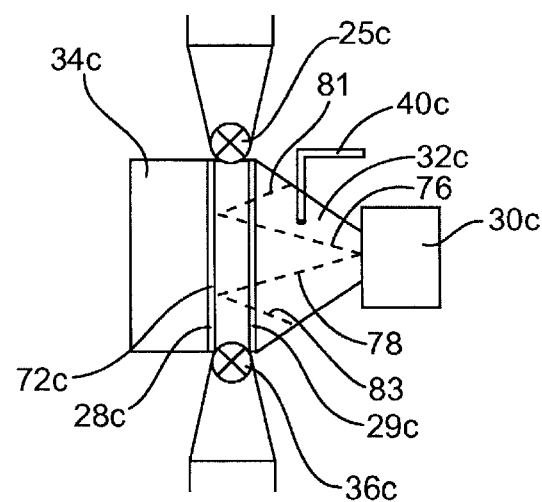
FIG. 9 is a side elevation view similar to FIG. 8 and illustrating a microwave reflective surface on one of the parallel plates.

With respect to the barrier 72c which forms the wall 28c, it must also be porous in an embodiment including the purging gas conduit 40c. With respect to the microwave energy, the barrier 72c can be transmissive so that the microwave energy passes in only one direction, right to left in FIG. 8, through the barriers 72c, 74c and the media 12c. Alternatively, the barrier 72c can be reflective of the microwave energy as illustrated in FIG. 9. In this embodiment, the barrier 72c is porous to accommodate the purging gas, but is reflective of the microwave energy. In such an embodiment, the microwave energy passes right to left through the media 12c as shown by dotted lines 76 and 78, but is reflected by the barrier 72c so that the microwave energy also travels left to right as shown by the dotted lines 81 and 83.

Figure 10:
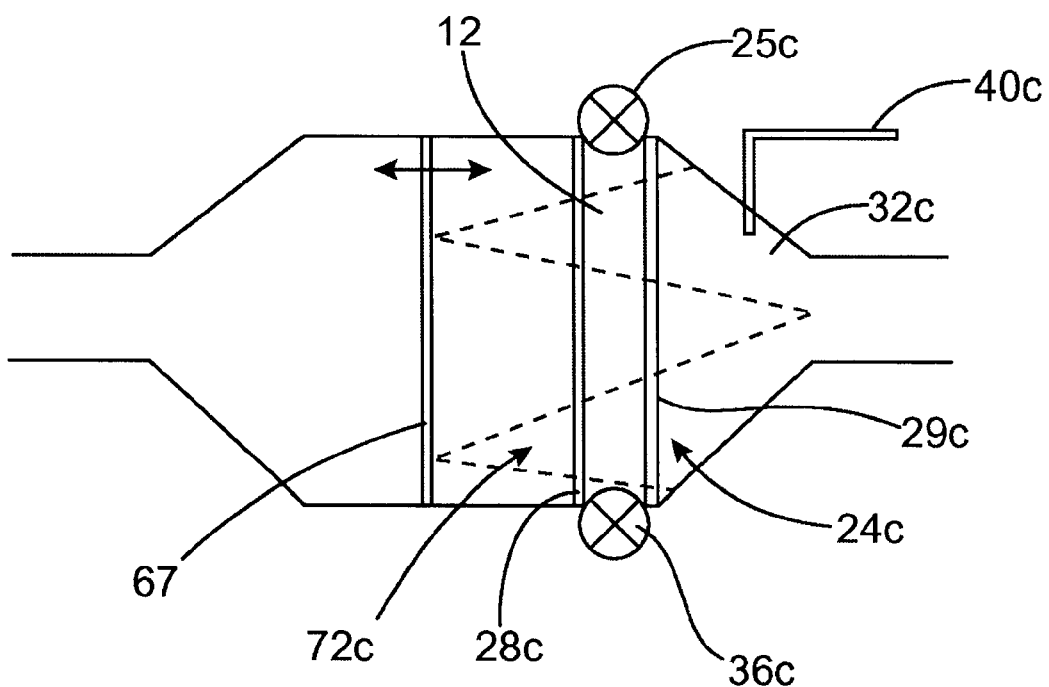
FIG. 10 is a side elevation view similar to FIG. 9 and illustrating two plates for media direction and a third plate for microwave reflection or adsorption.

In the embodiment of FIG. 9, it will be appreciated that the barrier 72 performs many functions. First, it helps contain the flow of media and define the adsorption chamber; second, it is transmissive to the purging gas; and third it is reflective of the microwave energy. This later function is separated from the barrier 72c in a further embodiment illustrated in FIG. 10. In this embodiment, an adjustable perforated metal plate can be positioned outside and downstream of the desorption chamber to reflect the microwave energy back into the desorption chamber. By maintaining this plate 67 adjustable relative to the desorption chamber, it can be tuned to reflect the microwave energy to optimum settings. In a similar embodiment where the reflection of microwave energy is not desired or required, the plate 67 can be provided with a microwave adsorption surface. Appreciating that such a surface may become quite hot as it adsorbs the microwave energy, cooling coils may be desirable to cool the plate 67 in such an embodiment.

Figure 11:
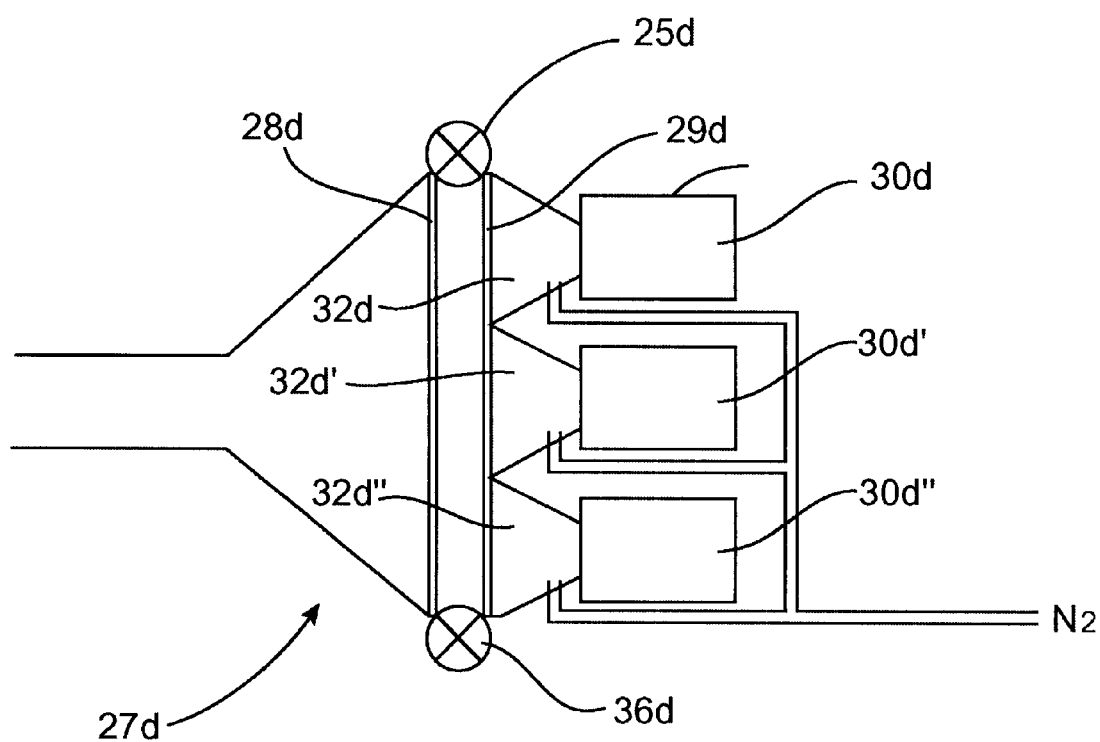
FIG. 11 is a side elevation view similar to FIG. 8 and showing multiple microwave generators.

In a further embodiment of the invention illustrated in FIG. 11, elements of structure similar to those previously discussed are designated with the same reference numeral followed by the lower case letter "d." In this embodiment, which includes the walls 28d and 29d, the single magnetron 30 discussed with reference to previous embodiments, is replaced with multiple microwave generators. These magnetrons, designated with the reference numeral 30d' and 30d", are generally positioned in series resulting in power flexibility, and an improved energy pattern. Although some redundancy may occur, this embodiment will tend to have a more uniform temperature distribution throughout the desorbtion chamber 27d. Each of the magnetrons 30d, 30d' and 30d" prime introduces its microwave energy through an associated horn 32d, 32d' and 32d", respectfully, to the desorbtion chamber 27d.

Figure 12:
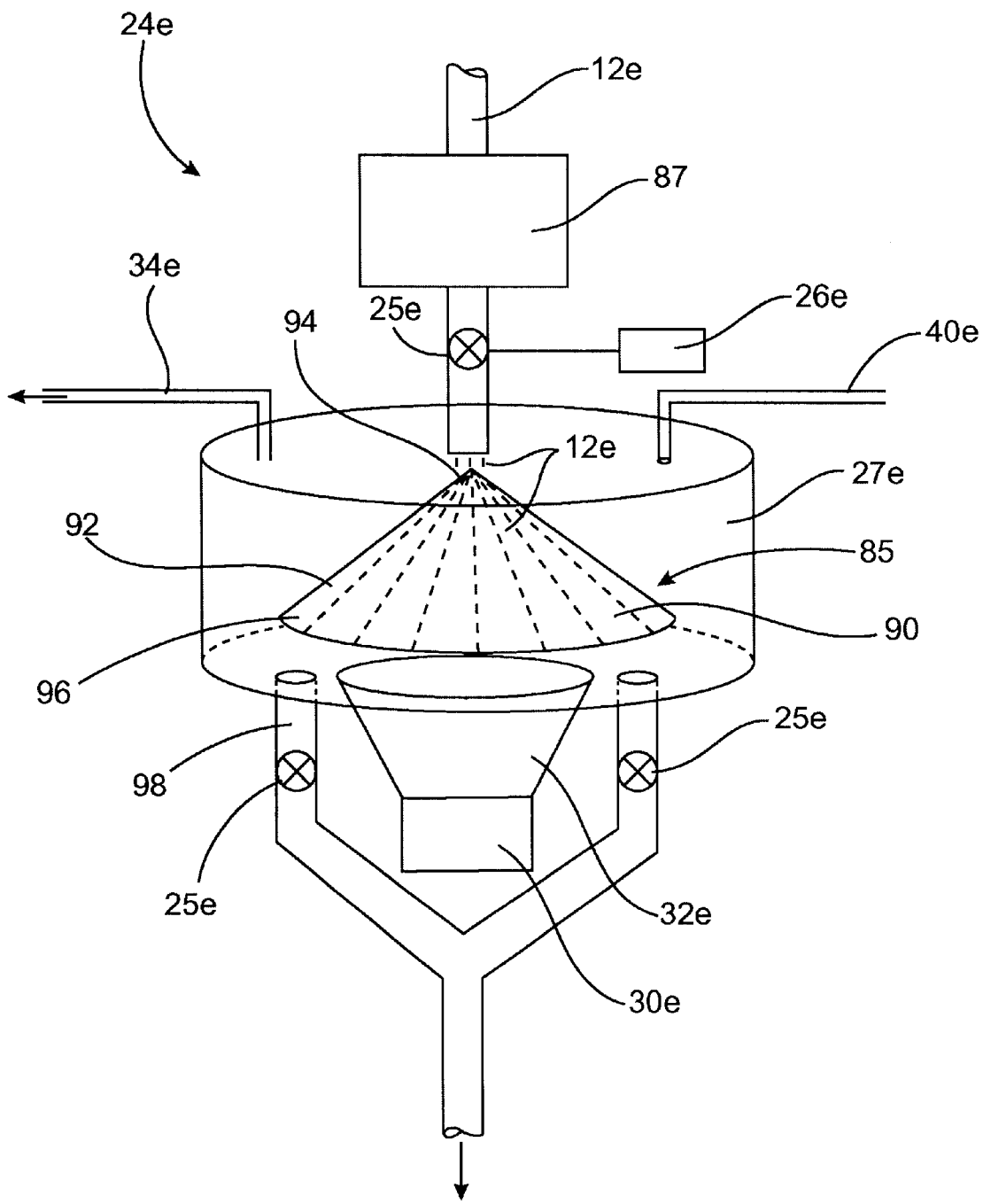
FIG. 12 is a perspective view of a media shaper capable of producing a monolayer of the media in a desorber of the present invention.

Another embodiment of the media flow shaper is illustrated in FIG. 12 and designated by the reference numeral 85. In this embodiment elements of similar structure are designated by the same reference numeral followed by the lower case letter "e." Thus, in the desorber 24e of FIG. 12, the contaminated media 12e is introduced by the rotary valve 25e from a holding tank 87 and onto an inclined surface 90 such as that provided by a cone 92 having a apex 94 and a base 96. In the context of the cone 92, the media or beads 12e flow from the apex 94 toward the base 96, encountering an increasing area of the surface 90. This increasing area causes the beads 12e to automatically spread out until they form a monolayer having a depth equivalent to the diameter of only one bead. Thus the diameter of this media flow shaper is capable of achieving the ultimate minimum depth of the media flow.

In such an embodiment, the magnetron 30e and associated waveguide 32e can be disposed beneath the base 96 of the cone 92. When the cone 92 is made of a transmissive material such as ceramic, the microwave energy passes through the cone 92 and into the beads 12e flowing along the surface 90. Volatiles driven from the beads 12e can be exhausted from the chamber 27e by the purging gas introduced through the conduit 40e and exhausted by the vacuum 34e. The clean beads 12e can than be removed in a continuous flow from the bottom of the chamber 27e by one or more conduits 98 each associated with a valve 25e.

It will be appreciated that in this embodiment, the surface 90 of the cone 92 is representative of any surface inclined with respect to the force of gravity. With this orientation, the media 12e automatically flows along the surface 90. When the inclined surface is conical, its area increases downwardly thereby promoting a monolayer depth of the media 12e in this embodiment.

Figure 13:
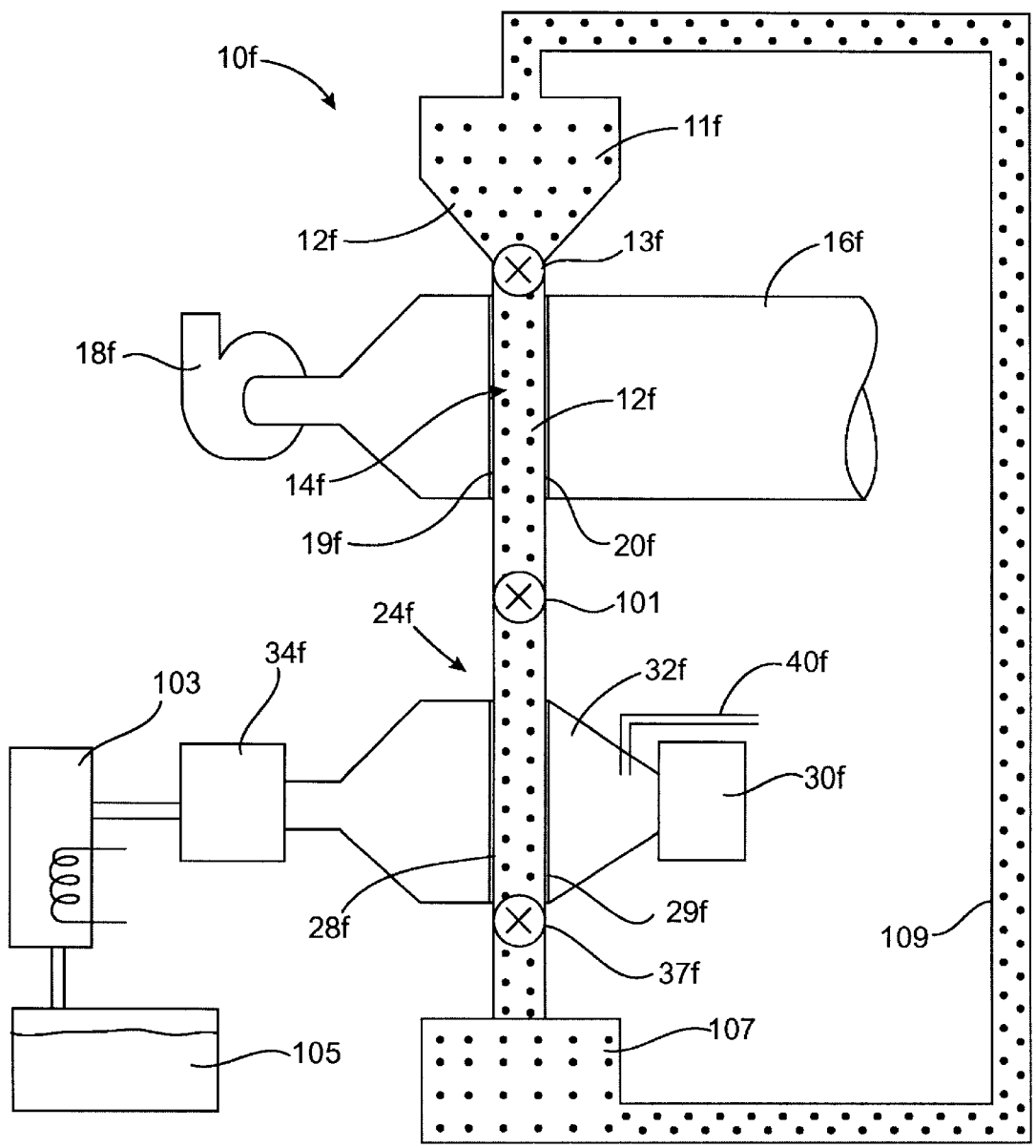
FIG. 13 is a schematic view of a closed system including a continuous adsorber and continuous desorber associated with the present invention.

In a further embodiment of the invention illustrated in FIG. 13, the adsorber 10 of the present invention is coupled to the desorber 24 of the present invention in a closed loop construction which greatly reduces the volume of media required, and consequently the resulting cost of the system.

In FIG. 13, elements of structure similar to those previously discussed are designated by the same reference numerals followed by the lower case letter "f." Thus the adsorber 10f is illustrated with a parallel plate media flow shaper as discussed with reference to FIG. 7. The desorber 24f is coupled to the output of the adsorber 10f and includes a parallel plate media flow shaper as discussed with reference to FIG. 8. In this system, the media or beads 12f are collected in the hopper 11f and metered from the hopper 11f by the rotary valve 13f into the adsorption chamber 14f defined by the plates 19f and 20f. The separation of these plates 19f and 20f can be carefully controlled to achieve the advantages previously discussed. In a particular embodiment, the plates 19 and 20f forming the adsorption chamber are separated by a distance greater than that separating the plates 28f and 29f forming the desorption chamber. A flow of contaminated air can be introduced by the diffuser 16f across the plates 19f, 20f and the media 12f under the force of the blower 18f.

In this closed loop embodiment, the rotary valve 21 (FIG. 1) can be combined with the rotary valve 25 (FIG. 2) in a single rotary valve 101. In the closed media loop, this valve 101 functions to withdraw the contaminated media from the adsorber 1 Of and to introduce that contaminated media into the desorber 24f. In the desorber 24f, the contaminated media is passed through a parallel plate media flow shaper as previously discussed.

Microwaves generated by the magnetron 30f are directed through the waveguide 32f and across the wall 29f. Between the walls 29f and 28f, the VOCs are desorbed from the media and drawn across the wall 28f by the vacuum source 34f along with the purging gas from the conduit 40f. The VOCs are then liquified in a condenser 103 and collected in a container 105. The clean media or beads 12f are then withdrawn from the desorber by the rotary valve 37f and introduced to a collector 107 which is coupled in the closed loop through a conduit 109 which reintroduces the media or beads 12f to the hopper 11f.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but also in the sense of any special definition used in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

What is claimed is:

1. A desorption system for continuously desorbing a sorbate from a sorption media, comprising:
a source of microwaves having properties for separating the material from the sorption media;
a conduit coupled to the source of microwaves for directing the microwaves along an energy flow path;
a media flow shaper disposed in the energy flow path and being adapted to receive the sorption media with the sorbate sorbed onto the sorption media, the media flow shaper facilitating a flow of the sorption media;
a wall included in the media flow shaper for directing the media flow path transverse to the energy flow path, the wall being disposed between the media flow path and the source of microwaves and having properties transmissive of the microwaves; whereby, the conduit directs the microwaves through the wall and into the media flow path to desorb the sorbate from the sorption media;

a source of inert gas disposed outside the media flow shaper;

a conduit coupled to the gas source for directing the inert gas along a gas flow path transverse to the media flow path;

the wall being transmissive of the gas to permit the gas to pass into the media flow path and carry the desorbed sorbate away from the media; wherein:

the wall is a first wall;

the media flow shaper includes a second wall defining with the first wall the media flow path;

the first wall is porous to the gas; and the second wall is porous to the gas and the desorbed sorbate; and a third wall disposed on the side of the second wall opposite the first wall and having properties for reflecting the energy back through the second wall and into the media.

2. The desorption system recited in claim 1 wherein the wall has the configuration of a plane.

3. The desorption system recited in claim 1 wherein the wall has configuration of a cone.

4. A The desorption system recited in claim 2 wherein the plane of the wall is disposed generally perpendicular to the energy flow path.

5. The desorption system recited in claim 1 wherein the first wall is separated from the second wall by a generally constant distance.

6. The desorption system recited in claim 5 wherein the constant distance separating the first wall from the second wall is less than about one inch.

7. The desorption system recited in claim 1 wherein:

the sorbate includes volatile organic chemicals;

the energy is microwave energy; and the media includes resin beads.

8. The desorption system recited in claim 1 wherein:

the first wall is disposed between the energy conduit and the second wall;

the energy is directed through the first wall and into the flow of media; and the energy is reflected by the second wall back toward the flow of media.

* * * * *